(12) United States Patent
Tati et al.

(10) Patent No.: US 9,086,981 B1
(45) Date of Patent: Jul. 21, 2015

(54) EXPORTING GUEST SPATIAL LOCALITY TO HYPERVISORS

(75) Inventors: Kiran Tati, Santa Clara, CA (US);
Gabriel Tarasuk-Levin, Mountain View, CA (US); KaWing Ho, Mountain View, CA (US); Jesse Pool, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1010 days.

(21) Appl. No.: 12/938,107

(22) Filed: Nov. 2, 2010

(51) Int. Cl.
*G06F 12/00* (2006.01)
*G06F 12/10* (2006.01)
*G06F 9/455* (2006.01)

(52) U.S. Cl.
CPC ............ *G06F 12/10* (2013.01); *G06F 9/45558* (2013.01); *G06F 2009/4557* (2013.01)

(58) Field of Classification Search
USPC ............................................................ 711/6
See application file for complete search history.

(56) References Cited

U.S. PATENT DOCUMENTS

2010/0250869 A1* 9/2010 Adams et al. ................. 711/154
2011/0302577 A1* 12/2011 Reuther et al. .................... 718/1

OTHER PUBLICATIONS

M. Hines and K. Gopalan, "Post-Copy Based Live Virtual Machine Migration Using Adaptive Pre-Paging and Dynamic Self-Ballooning," Virtual Execution Environments (VEE), Mar. 11-13, 2009, Washington, DC, USA.

* cited by examiner

*Primary Examiner* — Jared Rutz
*Assistant Examiner* — Hamdy S Ahmed

(57) ABSTRACT

When a request is made to retrieve a guest physical page from memory and a page fault occurs, a guest virtual page address that corresponds to the guest physical page is identified along with addresses for guest virtual pages that are near the guest virtual page in the virtual address space. Each identified guest virtual page address is translated into a corresponding guest physical page address and the corresponding guest physical pages are loaded into memory.

12 Claims, 8 Drawing Sheets

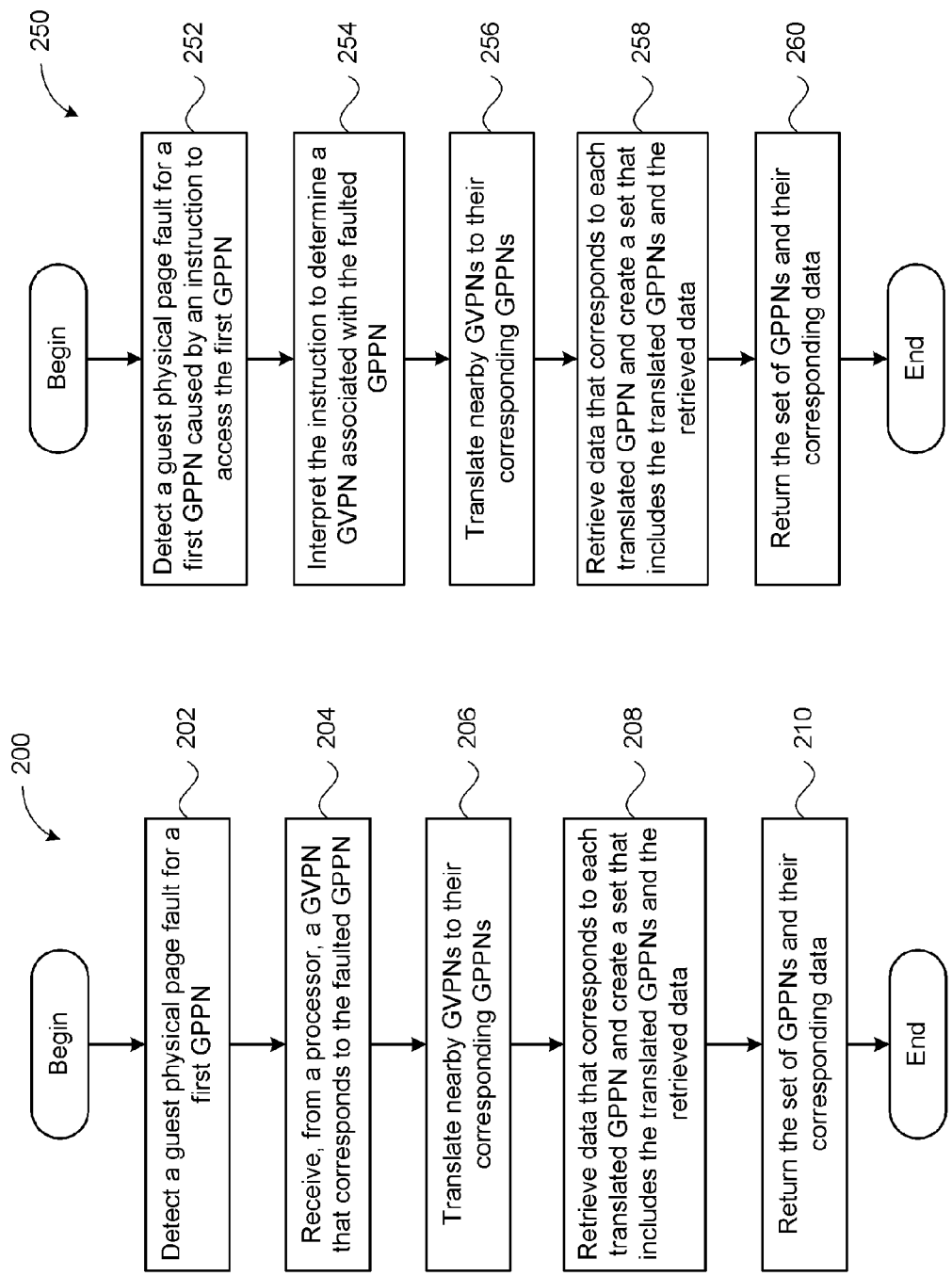

US 9,086,981 B1

EXPORTING GUEST SPATIAL LOCALITY TO HYPERVISORS

BACKGROUND

Computer virtualization is a technique that involves encapsulating a physical computing machine platform into a virtual machine (VM) executed under the control of virtualization software on a hardware computing platform. Virtualization software enables multiple virtual machines to be run on a single hardware computing platform, and may be used to manage the allocation of computing resources to each virtual machine.

VMs executing on a host machine are commonly referred to as a "guest." And each guest executes applications, such as a productivity application, webserver, database, and/or application servers. Spatial locality is a property of an application that states that if an application accesses a given memory address, it is likely to subsequently access nearby memory addresses. Applications exhibit spatial locality in the guest's virtual page number address space, referred to herein as GVPN space.

Virtualization software operates at the guest physical layer, without easily obtainable information of how guest physical page numbers (GPPNs) correspond to GVPNs. The locality exhibited by applications in the GVPN space may not translate to the guest physical layer because the guest operating system (OS) controls these translations. More specifically, if the guest OS maps GVPN V to P, it is not guaranteed that GVPN V+1 is mapped to P+1. Even if the guest OS tries to maintain spatial locality in the GPPNs, it can be difficult to preserve due to internal fragmentation and swapping. Some guest operating systems, such as the Windows®, operating system simply do not attempt to preserve spatial locality at the physical layer. Even in the cases of operating systems that prefer to maintain spatial locality at the physical layer, such as Linux® operating system, such locality will eventually be lost after repeated allocations/deallocations.

SUMMARY

One or more embodiments of the present invention provide techniques for exporting guest spatial locality to hypervisors to accelerate the process of loading guest physical pages into memory. According to one embodiment, when a request is made to retrieve a guest physical page from memory and a page fault occurs, a guest virtual page address that corresponds to the guest physical page is identified along with addresses for guest virtual pages that are near the guest virtual page in the virtual address space. Each identified guest virtual page address is translated into a corresponding guest physical page address and the corresponding guest physical pages are loaded into memory.

Additional embodiments of the present invention provide a non-transitory computer readable storage medium and a computer system each containing instructions which, when executed by a processing unit, cause the processing unit to carry out one or more of the methods described herein.

BRIEF DESCRIPTION OF THE DRAWINGS

FIG. 2A illustrates a method for exposing guest virtual page spatial locality using a hardware implementation, according to one embodiment of the invention;
FIG. 2B illustrates a method for exposing guest virtual page spatial locality using a software implementation, according to another embodiment of the invention.

DETAILED DESCRIPTION

Figure 1A:
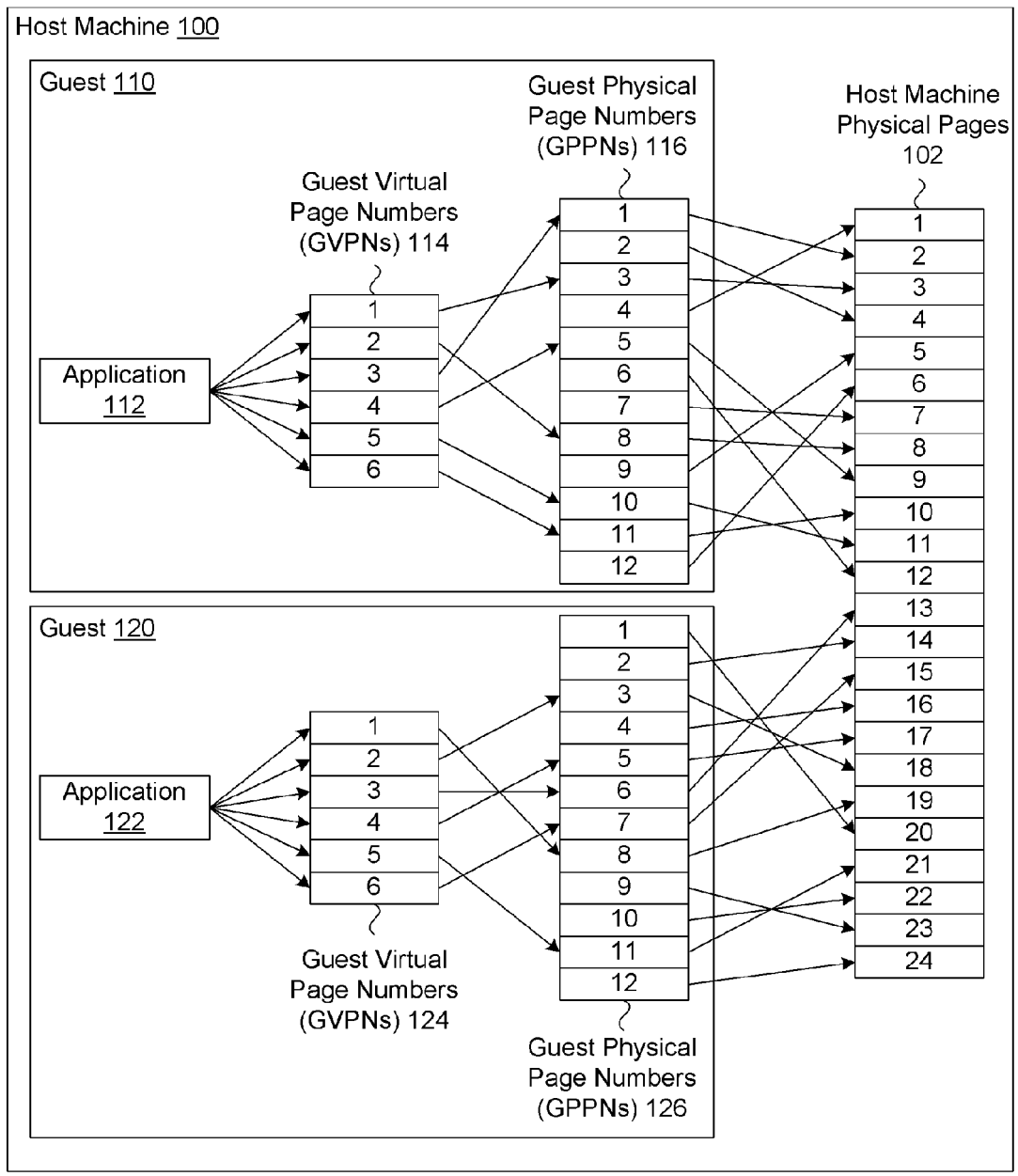
FIG. 1A is a schematic diagram of a host machine that is executing one or more guests, according to an embodiment of the present invention.

Embodiments of the invention provide methods and systems that expose GVPN spatial locality when moving running guests between servers, performing host-level swapping, and performing guest suspends and resumes. In particular, embodiments of the invention provide techniques for catching a page fault for a particular GVPN, locating a nearby GVPN pages, and translating each nearby GVPN page back into the GPPN space. Each translated GPPN is subsequently returned along with the faulted GPPN.

Exporting spatial locality can be used to enhance the performance of guest execution in a variety of scenarios. A first example is the movement of a running guest from one server to another server, herein referred to as "live migration." VMotion™ by VMware, Inc. of Palo Alto, Calif. can be used to perform such live migrations. The goal of a guest live migration is to copy or move the complete memory state of a given guest running on a source host to a destination host—while the memory state of the guest is changing, with minimum impact on the performance of the guest. Typically, a live migration is executed using multiple memory precopy passes, in which each precopy round copies only memory that has changed since the last precopy round. Provided that network bandwidth exceeds the guest's page "dirty" rate, the precopy process will eventually converge on a small set of dirty memory. When this convergence occurs, the source guest is then stunned, the remaining set of pages is transferred from the source host to the destination host, and the destination guest is resumed. For more information on live migration of guest VMs, see, e.g., U.S. Pat. No. 7,484,208, which issued Jan. 27, 2009 and U.S. Pat. No. 7,680,919, which issued Mar. 16, 2010.

However, if the page dirty rate exceeds network bandwidth, the source guest may be forced to stop and the destination guest resumed prior to the entire source guest's changed memory contents being transmitted to the destination host. A background thread continues transmitting the remaining changed pages from the source guest, linearly, in GPPN order. As the destination guest encounters pages that aren't present in memory (i.e., a page fault), the destination guest performs remote page faults that pull necessary pages in from the source guest. This allows the destination guest to achieve significantly lower application downtime compared to the alternative of simply stopping the destination guest until all of the changed memory has arrived. Note that the time spent handling each remote page fault may impact guest application performance.

In one embodiment, a GPPN page fault at the destination guest is caught, the faulted GPPN address is translated into the GVPN space, nearby GVPN pages are determined, and each nearby GVPN page is translated back into the GPPN space. Each GPPN mapped to GVPNs adjacent the faulted GVPN is subsequently returned along with the faulted GPPN. Thus, when the destination guest accesses a subsequent GVPN, the corresponding GPPN is already loaded into memory, thereby preventing the costly page fault that typically occurs using present implementations.

A second example of the benefits of exporting spatial locality can be seen when performing host-level swapping. Host-level swapping refers to the virtualization manager removing a guest's physical pages to alleviate memory pressure when a host's memory is over-committed. These pages are typically relocated to a storage disk. When the guest attempts to recover these pages the performance can suffer due to swap-in latency.

To address this scenario, in one embodiment, GVPN spatial locality can be used to predict expected subsequent swap-in requests. More specifically, nearby pages are pre-fetched from the storage disk along with the requested page (provided any GVPN spatially local pages have also been paged out to disk). Thus, the overall number of guest physical page faults (GPHYS faults) and associated swap-ins performed is reduced.

Still another example is the use of GVPN spatial locality to enhance the performance of guest suspends and resumes. In present virtual machine environments, guest suspend operations write a guest's memory pages into a file in increasing order starting with the first GPPN. This approach results in the same poor spatial locality described above. To address this scenario, in one embodiment, the guest's pages are written in GVPN order. Upon resuming the guest, the above swap pre-fetch optimization can then be applied. Note, writing the pages in GVPN order not only encapsulates GVPN mappings in the file, but also arranges for relevant GPPNs to be written together linearly.

FIG. 1A is a diagram of a host machine 100 executing one or more guests, according to an embodiment of the present invention. The term host machine as used herein refers to a physical computing device that provides an environment to execute one or more guests. As shown, the host machine 100 includes a guest 110 and a guest 120, where both the guest 110 and the guest 120 are virtual machines executing applications on the host machine 100. The host machine 100 also includes host machine physical pages 102 accessed by the guest 110 and the guest 120. The term "host machine physical page" means an addressable unit of physical memory. The machine physical page number (MPPN) is the address of a corresponding machine physical page.

Illustratively, the guest 110 includes an application 112, guest virtual page numbers (GVPNs) 114, and guest physical page numbers (GPPNs) 116. The term guest virtual page number is used herein to refer to a virtual page number that is mapped to a guest physical page number, and the term guest physical page number is used herein to refer to a memory location treated by the guest system software as a an address of physical memory but is actually a page number mapped to a host MPPN, that is a static address of a physical memory location of the host. Thus, a GPPN does not directly reference a physical block of memory, but instead references a pointer (i.e., the MPPN) to a physical block of memory, much like the GVPN is mapped to the GPPN. As shown, the GPPNs 116 are mapped to a portion of the host machine physical pages 102. In some cases, not all of the GPPNs 116 are mapped to a host machine physical page 102; thus, when an unmapped GPPN 116 is accessed by a guest, a page fault occurs and is handled according to the techniques described herein. Such mapping allows the guest 110 to operate using a physical address space that appears, to the guest 110, to be physically present within the guest 110. Notably, in most configurations, the number of host machine physical pages 102 is divisible by the number of GPPNs 116, thereby allowing a plurality of guests to execute within the guest 110. As also shown, guest 110 executes application 112, which references the contiguous GVPNs 114. By "contiguous," it is meant the address space includes addresses that are sequentially numbered. Each of the GVPNs 114 are mapped to a specific GPPN 116 which, as depicted in FIG. 1A, is typically non-contiguous from the perspective of application 112. Such a virtual memory system allows the application 112 to reference a virtually contiguous section of pages that are not necessarily contiguously stored in physical blocks of memory.

Similarly, the guest 120 includes application 122, GVPNs 124, and GPPNs 126. As shown, the GPPNs 126 map to MPPNs for host machine physical pages 102 on the host physical machine 100. Again, such mapping allows the guest 120 to operate using a physical address space that appears, to the guest 120, to be physically present within the guest 120. As also shown, the application 122 is executing within the guest 120, where the application 122 references the contiguous GVPNs 124.

As an example, assume the application 112 is a database server that is executing within the guest 110, and the application 122 is a webserver that is executing within the guest 120, where the guest 110 and the guest 120 are each executing on the host machine 100. As described above, each of the guests 110 and 120 operate as if they are each executing on separate physical host machines, which allows the applications 112 and 122 to execute on the guests 110 and 120 without any additional configuration. Each of the applications 112 and 122 references the contiguous GVPNs 114 and 124, respectively. Again, the GVPNs 114 and 124 non-contiguously refer to the GPPNs 116 and 126, respectively, where the GPPNs 116 and 126 are also non-contiguously mapped to the host machine physical pages 102.

Figure 1B:
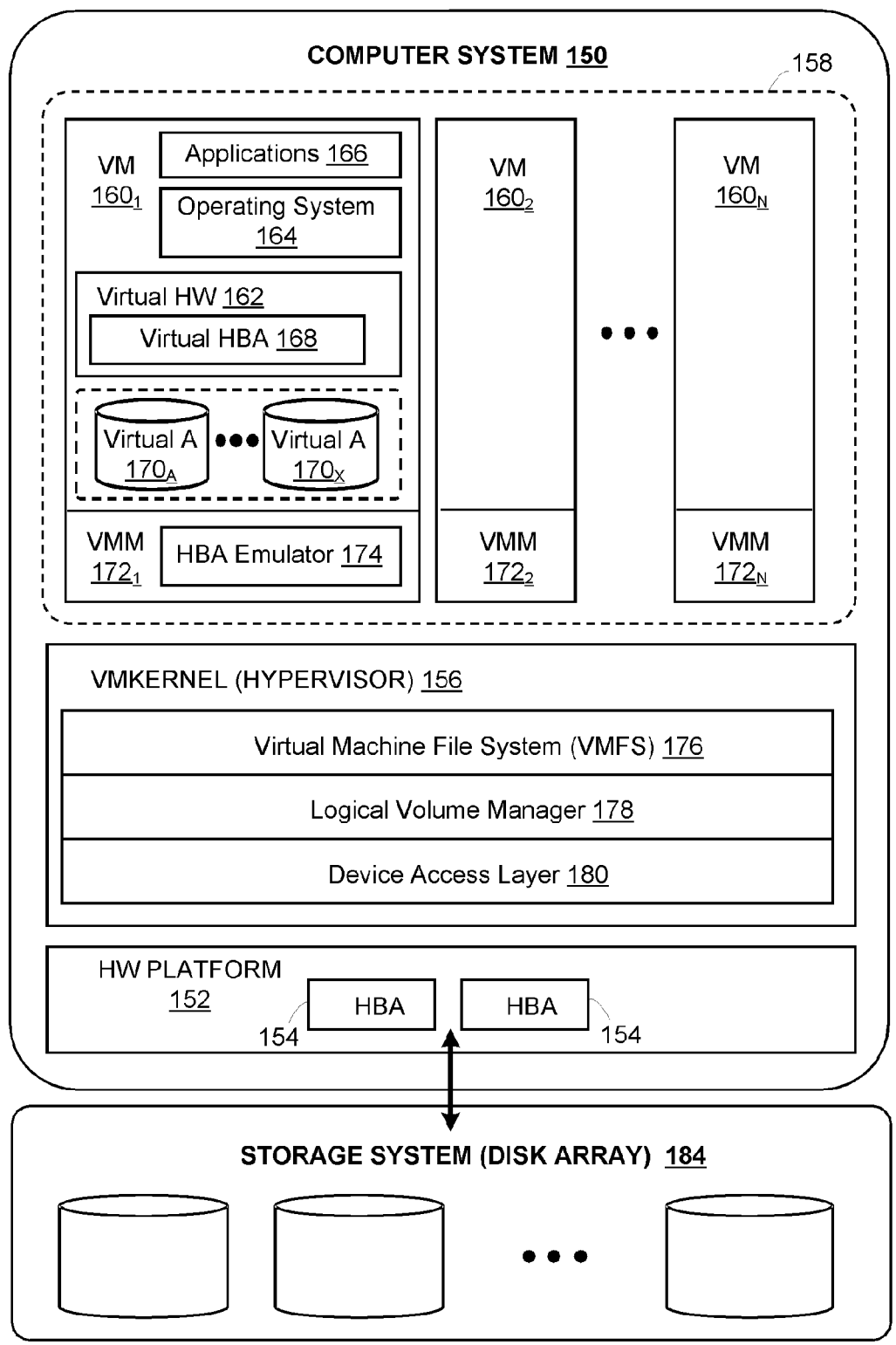
FIG. 1B illustrates the components of the host machine of FIG. 1A in additional detail.

FIG. 1B is a functional block diagram of a virtualized computer systems in which embodiments of the invention may be practiced. Computer system 150 may be constructed on a conventional server-class, hardware platform 152 including host bus adapters (HBA) 154 in addition to conventional platform processor, memory, and other standard peripheral components (not separately shown). The term "HBA" should be broadly construed to include any storage connectivity interface such as iSCSI, Fibre Channel, as well as eSATA, SATA, SCSI, IDE, FireWire, USB, etc. Hardware platform 152 may be coupled to an enterprise-class storage system 184. Examples of storage systems 184 may be a network attached storage (NAS) device, storage area network (SAN) arrays, or any other similar disk arrays. It should also be recognized that enterprise-level implementations of the foregoing may have multiple computer systems similar to computer system 150 that may be connected through various different known topologies and technologies (e.g., switches, etc.) to multiple storage systems 184. A virtualization software layer (also sometimes referred to as a hypervisor) such as, for example, VMkernel 156 is installed on top of hardware platform 152 and supports a virtual machine execution space 158 within which multiple VMs $160_1$-$160_N$ may be concurrently instantiated and executed. Each such virtual machine $160_1$-$160_N$ implements a virtual hardware (HW) platform 162 that supports the installation of a guest operating system 164 which is capable of executing applications 166. Examples of guest operating system 164 may be the Microsoft Windows® operating system, a distribution of the Linux® operating system, Solaris x86, NetWare, FreeBSD or any other supported operating system. In each instance, guest operating system 164 includes a native file system layer (not shown), for example, either an NTFS or an ext3 type file system layer. These file system layers interface with virtual hardware platform 162 to access, from the perspective of guest operating systems 164, a data storage HBA, which in reality, is virtual HBA 168 implemented by virtual hardware platform 162 that provides the appearance of disk storage support (i.e., virtual disks $170_A$-$170_x$) to enable execution of guest operating system 164 transparent to the virtualization of the system hardware.

Although, from the perspective of guest operating systems 164, file system calls to initiate file system-related data transfer and control operations appear to be routed to virtual disks $170_A$-$170_x$, in reality, such calls are processed and passed through virtual HBA 168 to adjunct virtualization software layers (for example, VMM layers $172_A$-$172_N$) that implement the virtual system support needed to coordinate operation with VMkernel 156. In particular, host bus adapter emulator 174 functionally enables guest operating system file system calls to be correctly handled by VMkernel 156 which passes such operations through to physical HBAs 154 that connect to storage system 184. For example, VMkernel 156 may receive file system calls from VMM layers $172_A$-$172_N$, and convert them into file system operations that are understood by virtual machine file system (VMFS) 176 which in general, manages creation, use, and deletion of files stored on storage system 184. VMFS 176, in turn, converts the file system operations to volume block operations, and provides the volume block operations to logical volume manager (LVM) 178, which supports volume oriented virtualization and management of the disk volumes in storage system 184. LVM 178 converts the volume block operations into raw disk operations for transmission to device access layer 180. Device access layer 180, including device drivers (not shown), applies command queuing and scheduling policies to raw disk operations and sends them to HBAs 154 for delivery to storage system 184.

FIG. 2A illustrates a method 200 for exposing guest virtual page spatial locality using a hardware implementation, according to one embodiment of the invention. In this particular example, a VM kernel hosts a guest and executes on a processor within a host machine, where the processor is capable of identifying a guest physical page fault, reading the faulted guest physical page, and returning the faulted guest physical page along with the guest virtual page that references the faulted guest physical page. Such processing capabilities can be provided by, for example, the Nehalem family of processors manufactured by Intel Corporation of Santa Clara Calif. In step 202, the VMkernel detects a guest physical page fault for a first GPPN, where an application executing within the guest is requesting the guest physical page. Such a page fault may occur when, for example, the data that corresponds to the guest physical page number is not present in the volatile memory of the host machine, such as a random-access memory (RAM). In this example, the data that corresponds to the guest physical page number is stored in the non-volatile storage of the host machine, e.g., on a hard drive (HD). Additional examples of page fault causes include the absence of a virtual to physical page mapping, an access permission violation, or writing to read-only memory. When a page fault occurs, the VMkernel locates the data that corresponds to the faulted page within the non-volatile storage, reads the data from the non-volatile storage, and transfers the data into the volatile memory. When this process completes, the data that corresponds to the faulted page is accessible in the volatile memory and can be returned to the application that requested the page. Thus, when this page is subsequently accessed by the application, the data that corresponds to the page is readily available to be read from the volatile memory, thereby eliminating a page fault and increasing the overall speed of the application.

In step 204, the VM kernel receives, from the processor, a guest virtual page number that corresponds to the faulted guest physical page number. Thus, following step 204, the physical page is loaded into memory and is returned to the requesting application as described above.

In step 206, the VM kernel translates nearby guest virtual page numbers to their corresponding guest physical page numbers. In one embodiment, the VM kernel is user-configured to determine X virtual addresses that follow (and/or precede) the returned virtual page number. For example, a user may configure the VM kernel to gather ten pages that follow the virtual page of the faulted page when a page fault occurs. Consider a scenario of a page fault occurring where a virtual page number of 224 is returned for the faulted page. In this case, the VM kernel determines that the virtual page numbers 225-334—and, possibly, the virtual page numbers 215-223, depending on the configuration—are near the returned virtual page number. Such a configuration, however, may compromise the performance of the system due to the latency that accompanies gathering the ten additional physical pages referenced by the virtual page numbers 225-334. Note, the VMkernel may also be configured to step both forward and backward when determining nearby pages, as is advantageous since applications do not always access virtual page numbers in sequential order. Each nearby guest virtual page number is subsequently translated into a corresponding guest physical page number.

In one embodiment, a page table stores a set of guest virtual page numbers and their corresponding guest physical page numbers. This page table may be created by the guest operating system in accordance with any format that is required by the processor. In this example, the page table can be thought of as having x rows and two columns per row, where the first column stores the guest virtual page number and the second column stores the corresponding guest physical page number. For example, a row may contain information that states that a guest virtual page 1 corresponds to a guest physical page number 112, while another row may contain information that states that a guest virtual page 2 corresponds to a guest physical page number 62. This information can also be compressed to reduce the overall size of the page table. The VMkernel can read this page table and identify the GPPNs that are mapped to the GVPNs that precede or follow the GVPN of the page that triggered the guest physical page fault. This step may be referred to as exporting the spatial locality of the virtual address space to the hypervisor. Once the GPPNs are known, the corresponding guest physical pages may be read.

In step 208, the VMkernel retrieves data that corresponds to each translated guest physical page number (i.e., the contents of the associated page in memory) and creates a set that includes the translated guest physical page numbers and the retrieved data. The data that corresponds to each translated GPPN may be present in either the volatile memory or the non-volatile storage of the host system, depending on conditions such as the last time each guest physical page number was accessed by the application running on the VM. As described above in step 202, a page fault occurs when the processor is unable to locate the data that corresponds to a guest physical page number in the volatile memory. Alternatively, if the data that corresponds to a guest physical page number is stored in the volatile memory, a page hit occurs, and the data is immediately returnable. The VM kernel performs a lookup of each of the translated guest physical page numbers so that the data referenced by each of the translated guest physical page numbers is gathered into a returnable set. Each of the translated guest physical page numbers are included with the retrieved data in the set, and the step 210 follows.

In step 210, the VM kernel returns the set of guest physical page numbers and their corresponding data. Therefore, the VM kernel has successfully exposed guest virtual page spatial locality by using only a physical page number. Such spatial locality of the guest virtual pages ensures that, when an application accesses nearby virtual page numbers, their corresponding physical pages will be present in volatile memory thereby eliminating the latency associated with the page faults that would normally occur.

FIG. 2B illustrates a method 250 for exposing guest virtual page spatial locality using a software implementation, according to another embodiment of the invention. In this example, a VM kernel hosts a guest and executes on a processor within a host machine, where the processor is configured to return only the physical address (and not the guest virtual address) of a page when a page fault occurs. Thus, in contrast to the method 200, additional software components (e.g., components of the hypervisor) are required to determine the guest virtual page number that is associated with the faulted guest physical page. In step 252, the VM kernel detects a guest physical page fault for a first guest physical page number caused by an instruction to access the first guest physical page number, where an application executing within the guest requests the guest physical page. Such a page fault may occur when, for example, the data that corresponds to the guest physical page number is not present in the volatile memory of the host machine, such as a random-access memory (RAM). In this example, the data is stored within the non-volatile storage of the host machine, such as a hard drive. Additional examples of page fault causes include the absence of a virtual to physical page mapping, an access permission violation, or writing to read-only memory. When a page fault occurs, the processor locates the data that corresponds to the faulted page in the non-volatile storage, reads the data from the non-volatile storage, and transfers the data into the volatile memory. When this process has completed, the data that corresponds to the faulted page is accessible in the volatile memory and the data can be returned to the application that requested the page. Thus, when it is subsequently accessed by the application, the data that corresponds to the page is readily available to be read from the volatile memory, avoiding another page fault on future accesses of the page.

In step 254, the VM kernel interprets an instruction to determine a guest virtual page number associated with the faulted guest physical page number. Since in many systems, a back-map is not available that maps the GPPN to corresponding GVPNs, this mechanism may be used to identify the GVPN being accessed that triggered the page fault when the processor does not otherwise provide this information, as was the case in the embodiment described above with reference to FIG. 2A. In one example, the VMkernel examines the state of the processor and registers at the time the execution context was shifted away from the virtual machine as a result of the guest physical page fault. When the guest physical page fault occurs, an exception is triggered and handled by an exception handler component of the VMkernel. This exception handler saves the state of the processor to a particular location in kernel memory. Then, when performing step 254, this state can be examined to identify the instruction that triggered the guest physical page fault. The instruction will specify a register or other location in memory that contains the address of the page that caused the fault. Thus, in step 254, the instruction triggering the fault can be parsed to determine the virtual address associated with the page fault that occurs in step 252. It should be noted that this step may be optimized to ignore page faults where the faulted page cannot be identified in a time-efficient manner, such as, for example, indirect jumps.

In step 256, the VM kernel translates nearby guest virtual page numbers to their corresponding guest physical page numbers. In one embodiment, the VM kernel is user-configured to determine X virtual addresses that follow (and/or precede) the returned virtual page number. For example, a user configures the VM kernel to, when a page fault occurs, gather ten pages that precede and follow the virtual page of the faulted page. It is also possible to gather X virtual addresses that follow the returned virtual page number and Y virtual addresses that precede the returned virtual page number. Consider the scenario of a page fault occurring and a virtual page number of 224 is returned for the faulted page. In this particular configuration, the VM kernel determines that the virtual page numbers 214-223 and that the virtual page numbers 225-334 are nearby the returned virtual page number. Such a configuration, however, may compromise the performance of the system due to the latency that accompanies gathering the twenty additional physical pages that are referenced by the virtual page numbers 214-223 and the virtual page numbers 225-334. Alternatively, the user may configure to the VM kernel to only gather a small number pages that precede the virtual page of the faulted page. Each nearby guest virtual page number is subsequently translated into a corresponding guest physical page number.

In one embodiment, a page table stores a set of guest virtual page numbers and their corresponding guest physical page numbers. In this example, the page table effectively has x rows and two columns per row, where the first column stores the guest virtual page number and the second column stores the corresponding guest physical page number. This information can also be compressed to reduce the overall size of the page table. The VM kernel passes the guest physical page numbers to the processor to request a read of each of the guest physical pages. The processor can translate the guest physical page numbers to the actual machine addresses where the corresponding data is stored, and retrieve the data.

In step 258, the VM kernel retrieves data that corresponds to each translated guest physical page number and creates a set that includes the translated guest physical page numbers and the retrieved data. The data that corresponds to each translated GPPN may be present in either the volatile memory or the non-volatile storage of the host system, depending on conditions such as the last time each guest physical page number was accessed by the application running on the VM. As described above in step 252, a page fault occurs when the processor is unable to locate the data that corresponds to a guest physical page number in the volatile memory. Alternatively, if the data that corresponds to a guest physical page number is stored in the volatile memory, a page hit occurs, and the data is immediately returnable. The VM kernel performs a lookup of each of the translated guest physical page numbers so that the data referenced by each of the translated guest physical page numbers is gathered into a returnable set. Each of the translated guest physical page numbers are included with the retrieved data in the set, and the step 260 follows.

In step 260, the VM kernel returns the set of guest physical page numbers and their corresponding data. Therefore, the VM kernel has successfully exposed guest virtual page spatial locality by using only a physical page number. Such spatial locality of the guest virtual pages ensures that, when an application accesses nearby virtual page numbers, the corresponding physical pages will be present in volatile memory thereby.

In some embodiments, a software implementation of a memory management unit (MMU) may be used in conjunction with a shadow page table to provide functionality similar to that described in the method 250, where the page table maintains a mapping of MPPNs to machine physical page numbers (MPPNs) and the shadow page table maintains a mapping from the GVPNs to the MPPNs. When a page fault occurs in processors that do not have virtualization extensions, specifically a technology known as EPT for "extended page tables," the GVPN of the faulted page will be provided by the processor when the processor encounters a page fault when running guest code. Subsequently, the determined GPPN may be determined from the corresponding GVPN using the techniques describe above in FIG. 2A.

As described above for FIGS. 2A-2B, both a hardware and a software implementation may be used to determine the guest virtual page number of a faulted guest physical page. This guest virtual page number is then used as a starting point to determine nearby guest virtual page numbers. When the nearby guest virtual page numbers have been determined, the nearby virtual page numbers are translated into corresponding guest physical page numbers, and each guest physical page is read from memory. Thus, spatial locality in the guest virtual page space can be used to improve performance in various scenarios, describe below in FIGS. 3-5.

Figure 3:
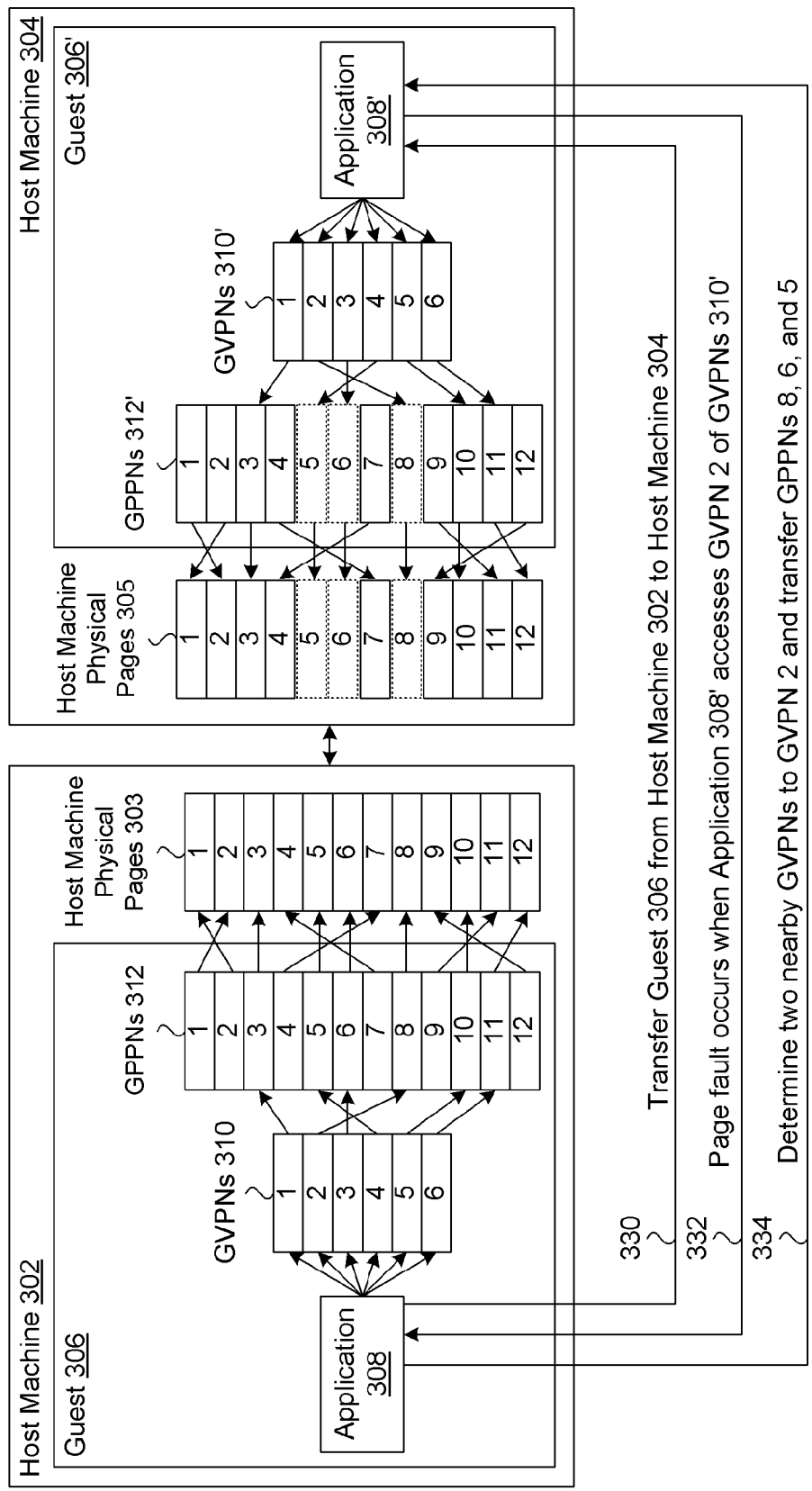
FIG. 3 illustrates an example of preserving spatial locality when performing a migration of a guest from a source host machine to a destination host machine, according to one embodiment of the invention.

FIG. 3 is an illustration of preserving spatial locality when performing a live migration of a guest from a source host machine to a destination host machine, according to one embodiment of the invention. The host machine 302 includes the host machine physical pages 303 allocated to the guest 306 executing on the host machine 302. The guest 306 includes an application 308, guest virtual page numbers (GVPNs) 310, and guest physical page numbers (GPPNs) 312. As shown, the GPPNs 312 are mapped to the host physical machine pages 303. The mapping allows the guest 306 to operate using a physical address space that appears, to the guest 306, to be physically included within the guest 306. As also shown, the application 308 is executing within the guest 306, where the application 308 references the contiguous GVPNs 310. Each of the GVPNs included in GVPNs 310 is mapped to a specific GPPN 312 which, as depicted in FIG. 3, is typically non-contiguous. Such a virtual memory system allows the application 308 to reference a virtually contiguous section of pages that are not necessarily contiguously stored in physical blocks of memory.

The host machine 304 includes the host machine physical pages 305. As shown by an event 330, the guest 306 executing on the host machine 302 is migrated to the host machine 304. A user or automated data center management system requests that guest 306 be migrated to the host machine 304. In one embodiment, a minimal portion of the data that is required to execute the guest 306 is transferred from the host machine 302 to the host machine 304 in response to the request. Illustratively, page 3 of the host machine physical pages 303 is transferred to the host machine physical pages 305, which includes information required to execute the application 308'. As also shown, guest 306' is executing within the host machine 304 using only a minimal amount of data.

Event 332 represents actions performed by both the host machine 302 and the host machine 304 when a page fault occurs within the guest 306' when executing the application 308'. Assume for this example that the application 308' is a database server that is attempting to perform a query on a table, where the table is addressed to the guest virtual address number 2 of GVPNs 310'. As shown, the GVPN 2 of GVPNs 310' refers to the GPPN 8 of GPPNs 312', which refers to the host machine physical page 8 of the host physical machine pages 305. Since the host machine physical page 8 has not been transferred from the host machine 302 to the host machine 304, a page fault occurs and the application 308' cannot perform the database query.

To cure this deficiency, a VMkernel executing on the host machine 304 requests that the host machine physical page 8 of the host machine physical pages 303 be transferred to the host machine 304. In addition, the VMkernel executing on host machine 304 identifies the GVPNs of nearby guest virtual pages for application 308' and sends a request for those GVPNs to the host machine 302. A VMkernel executing on the host machine 302 receives the request for the GVPNs and translates each to the corresponding machine physical pages. The VMkernel executing on host machine 302 retrieves the corresponding machine physical pages and transmits each back to the guest 306 in operation 334. The VM kernel executing on the host machine 304 receives each of the guest physical pages 8, 6 and 5 and inserts each into the appropriate slot of the host machine physical pages 305. The VM kernel executing on the host machine 304 may now successfully perform the query.

As described above, applications exhibit spatial locality when accessing guest virtual pages and therefore it is likely that the database server will access guest virtual pages near the GVPN 2 of the GVPNs 310'. For example, assume the database server next accesses the GVPN 4 of the GVPNs 310'. The GVPN 4 of the GVPNs 310' references the GPPN 5 of the GPPNs 312', which maps to host machine physical page 5 of the host machine physical pages 305. As previously described, the event 334 returned this host machine physical page 5 and, therefore, the page is present in the host machine physical pages 305, and a page hit occurs.

As described above, page faults can be avoided when migrating a guest VM from a source host machine to a destination host machine. A minimal amount of data associated with the guest may be transmitted to the destination host machine so that the guest can resume execution. In alternate embodiments, one or two iterations of page transmissions can occur prior to starting the guest VM on the destination host. When page faults occur within the guest executing on the destination host machine, the destination host determines the virtual address associated with the page, calculates nearby virtual addresses, and requests the corresponding GPPNs from the source host, which returns the page contents, along with the faulted page. Such pages are received by the guest executing on the source machine, which may then avoid the latency that is associated subsequent page faults.

Figure 4A:
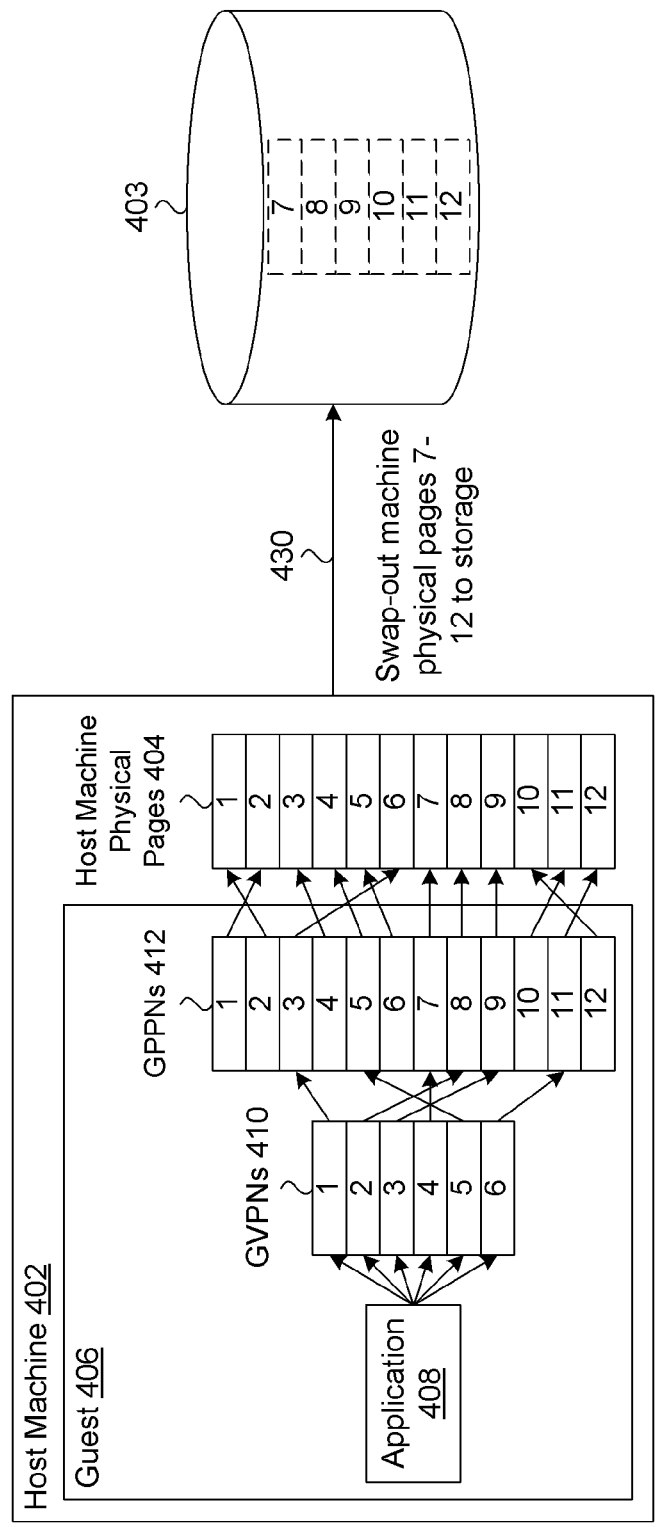
FIGS. 4A and 4B illustrate an example of preserving spatial locality when performing a host-level swapping, according to one embodiment of the invention.
Figure 4B:
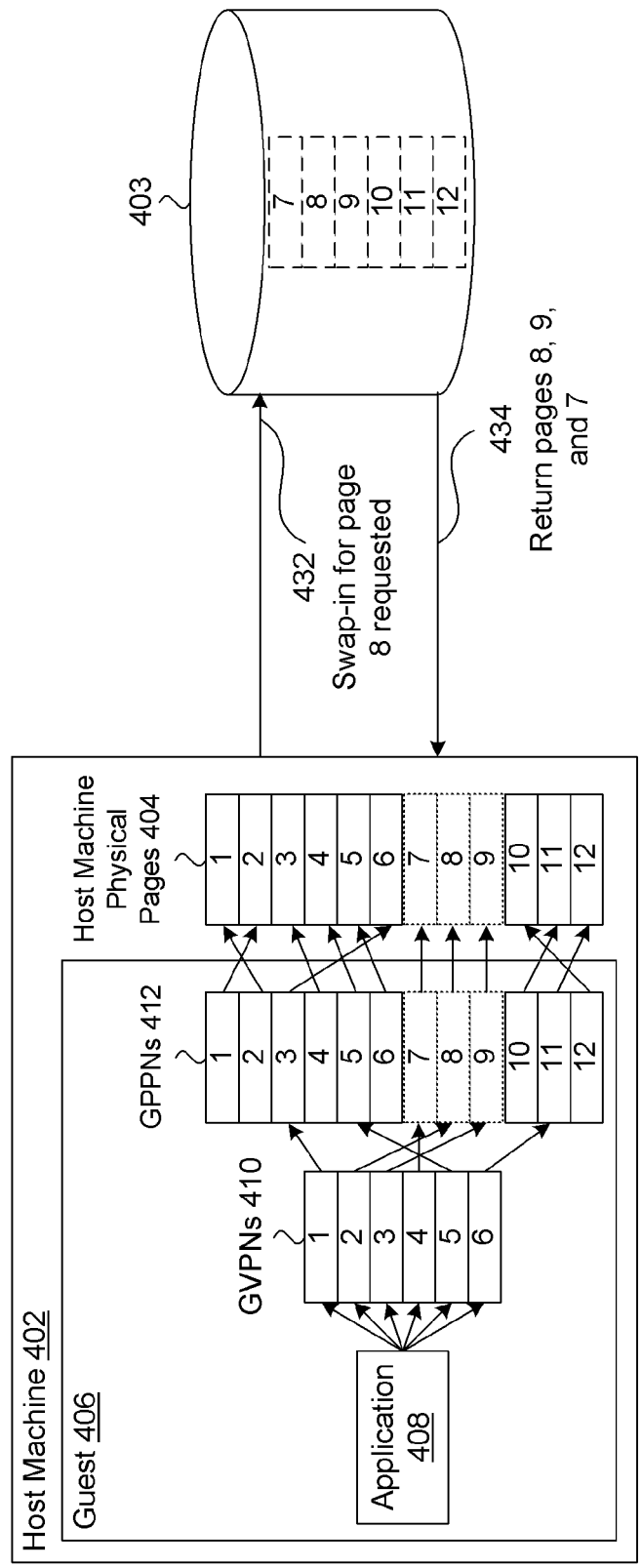

FIGS. 4A and 4B illustrate an example of exporting spatial locality when performing a host-level swap, according to one embodiment of the invention. As noted, above, host-level swapping refers to the virtualization manager storing a guest's physical pages in non-volatile disk storage to alleviate memory pressure when a host is over-committed. For example, assume a host has 2 GB of physical memory available and spawns three guest instances with 1 GB of memory each. In such a case, the host is overcommitted by 1 GB. Frequently, this is not a problem as many guests tend to not consume all of the memory they are allocated. However, when overcommitted, the VMkernel may swap some pages out to disk. Subsequently, when a page fault occurs, the VMkernel may pull into memory not just the page that results in a page fault, but also nearby pages—nearby relative to the virtual page space of the guest application. As shown in FIG. 4A, the host machine 402 includes the host machine physical pages 404 that are utilized by the guest 406 executing on the host machine 402. The guest 406 includes an application 408, guest virtual page numbers (GVPNs) 410, and guest physical page numbers (GPPNs) 412. The GPPNs 412 are mapped to the host physical machine pages 404. Also as shown, the application 408 is executing within the guest 406, where the application 408 references the contiguous GVPNs 410.

Storage 403 is connected to the host machine 402, where the storage 403 is used to facilitate swapping of the host machine physical pages 404. In one embodiment, a swap-out occurs when the host machine 402 hosts an additional guest. In other embodiments, a swap-out of a VM may occur as a result of a user limiting the amount of memory allocated to the VM, or when a VM is configured include an amount of memory that exceeds the memory that is available on the host. Assume the additional guest requires a more memory then is currently available on the host machine 402. Thus, to free the amount of memory that is necessary to accommodate an additional host, a portion of the host machine physical pages 404 can be written to the storage 403. As shown by event 430, pages 7-12 of the host machine physical pages 404 are transferred to the storage 403. Of course, any number of pages may be written to the storage 403.

Turning now to FIG. 4B, the host machine 402 illustrates the host machine 402 following the transfer of pages 7-12 from the physical pages 404. As shown, the application 408 continues to execute on the guest 406, and the guest 406 continues to execute on the host machine 402. However, the host machine physical pages 404—which are referenced by the GPPNs 412, do not include pages 7-12. The event 432 occurs when the application 408 addresses the GVPN 2 within GVPNs 410. As previously described, a page fault occurs as the GVPN 2 of the GVPNs 410 maps to page 8 of the GPPNs 412, where page 8 of the GPPNs 412 maps to page 8 of the host machine physical pages 404, which is not currently present. Thus, a swap-in request is generated for page 8.

A VMkernel executing on the host machine 402 receives this swap-in request, and in response communicates with the storage 403 to retrieve page 8. The VMkernel also determines that the GVPN 2 of the GVPNs 410 references the page 8 (e.g., using the methods described in either FIG. 2A or FIG. 2B). Once determined, the VM kernel calculates the GVPNs of pages near the GVPN 2 of the GVPNs 410 and translates each nearby GVPN to the corresponding GPPN. In one embodiment, the VMkernel is configured to determine two GVPNs that are nearby the GVPN 2—in this case, GVPN 3 and the GVPN 4, which are translated to the GPPN 9 and the GPPN 7, respectively. The VM kernel then parses the GPPNs 412 to determine if the translated GPPNs available in the host machine physical pages 404. For each page not present in the host machine physical pages 404, the VM kernel communicates with the storage 403 to retrieve the page.

Event 434 occurs when the VM kernel has retrieved page 8 and the nearby pages from the storage 403. As previously described, pages 8, 9 and 7 were swapped-out to the storage 403 and transmitted by the storage 403 back to the host machine 402. The VM kernel executing on the host machine 402 receives these pages from the storage 403 and places each into its respective position within the host machine physical pages 404.

As described above, applications exhibit spatial locality when accessing guest virtual pages and therefore it is likely that the application 408 will access guest virtual pages nearby the GVPN 2 of the GVPNs 410. For example, assume the application 408 next accesses the GVPN 4 of the GVPNs 410. The GVPN 4 of the GVPNs 410 references the GPPN 7 of the GPPNs 412, which maps to host machine physical page 7 of the host machine physical pages 404. As previously described, the event 434 returned this host machine physical page 7 and, therefore, a page hit occurs.

Figure 5A:
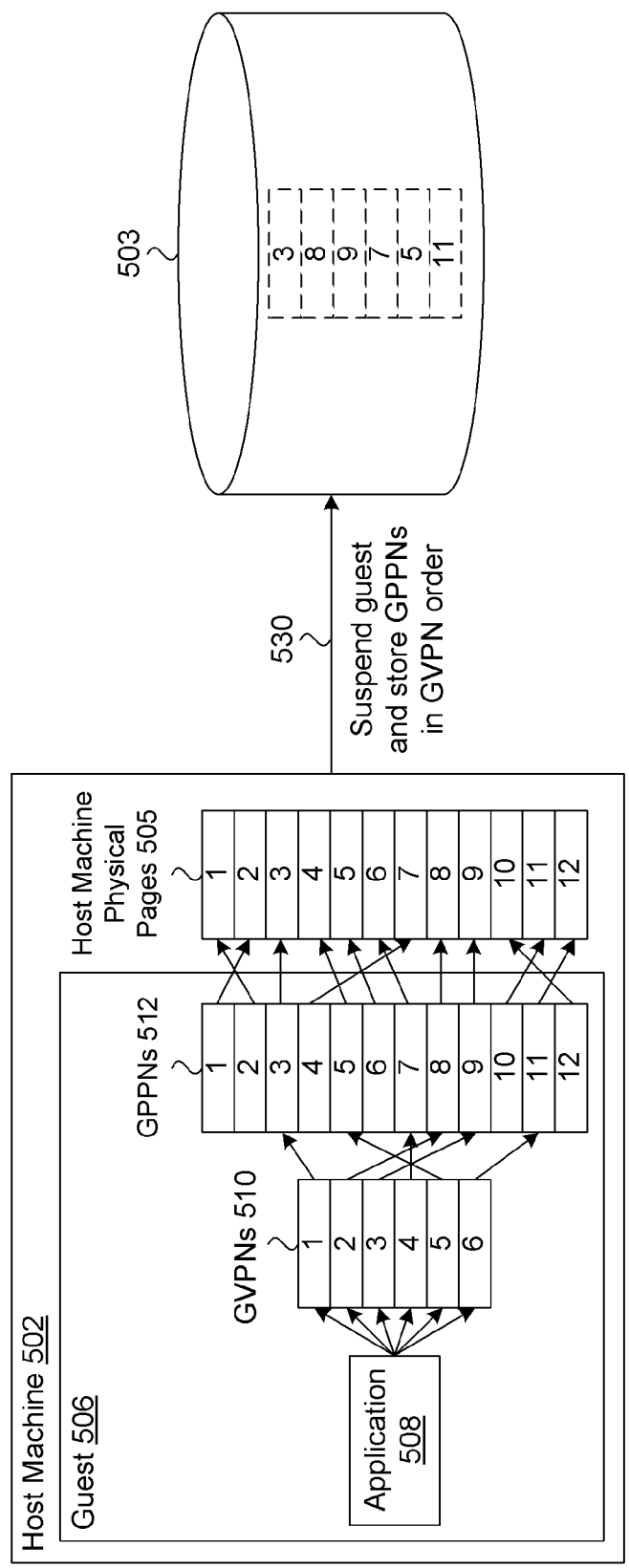
FIGS. 5A and 5B illustrate an example of preserving spatial locality when performing guest suspends and resumes, according to one embodiment of the invention.
Figure 5B:
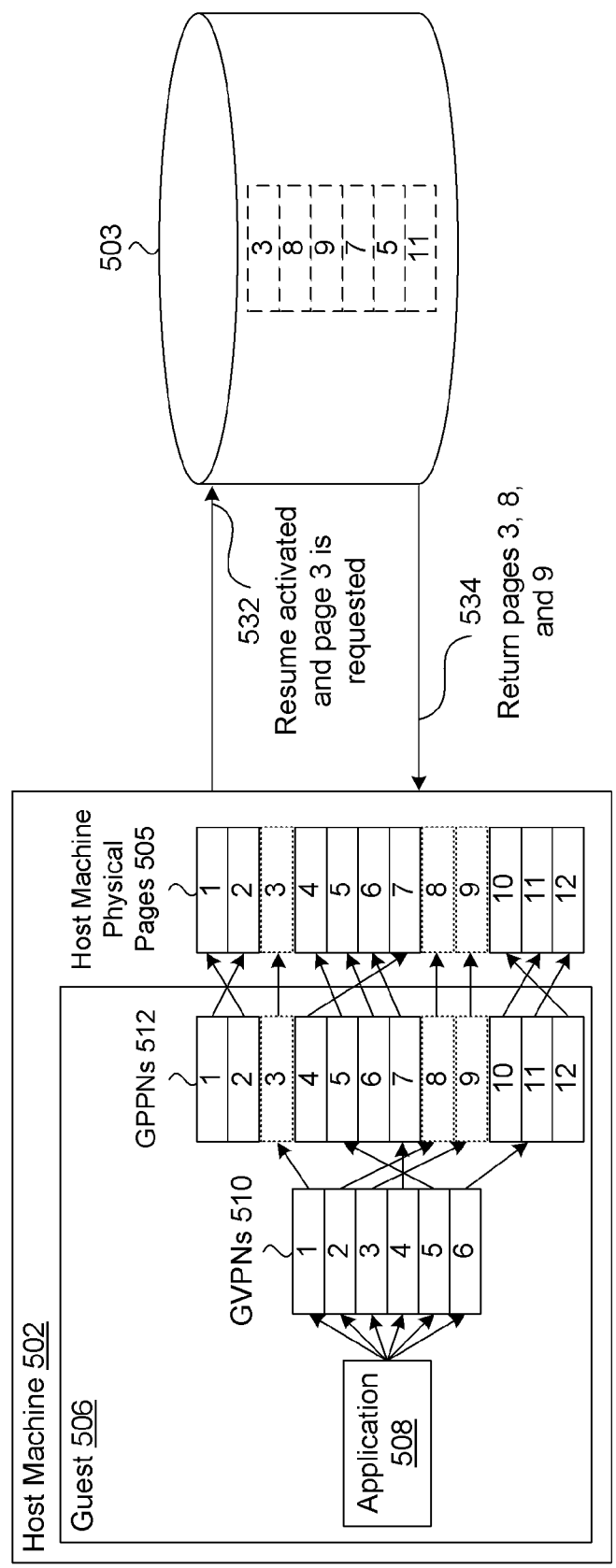

FIGS. 5A and 5B illustrate an example of preserving spatial locality when suspending and resuming a guest, according to one embodiment of the invention. As shown in FIG. 5A, the host machine 502 includes the host machine physical pages 505 used by the guest 506 executing on the host machine 502. The guest 506 includes an application 508, guest virtual page numbers (GVPNs) 510, and guest physical page numbers (GPPNs) 512. As shown, the GPPNs 512 are mapped to the host physical machine pages 505. As also shown, the application 508 is executing within the guest 506, where the application 508 references the contiguous GVPNs 510.

Storage 503 is connected to the host machine 502, where the storage 503 is used to facilitate guest suspends and resumes. In one embodiment, the guest 506 is suspended when a VMkernel executing on the host machine 502 receives a request to suspend the VM, either from a user or an automated data center management system. As shown by event 530, the guest 506 is suspended and all of the GPPNs referenced by the GVPNs 510 are transferred to the storage 503 in GVPN order. More specifically, the VM kernel executing on the host machine 502 parses the GVPNs 510, where GVPN 1 corresponds to the GPPN 3, GVPN 2 corresponds to GPPN 8, and so forth. Following the event 530, each of the GPPNs included in the GPPNs 512 is stored within the storage 503, and the guest 506 successfully enters a suspend mode. As is generally known, the suspend operation involves storing the complete state of the system including the memory allocated to the kernel and other running programs, as well as processor and device states. Suspend and resume operations of computers is well known, so the details need not be discussed here.

In one embodiment, the memory pages are stored to disk 503 in sequence according to the order of the GVPNs. That is, the GVPN to GPPN page table is traversed for each running application and the kernel itself, or for a subset thereof, and the physical pages are stored in an order that they would be accessed if the GVPNs in the virtual address spaces of the guest applications and programs were accessed sequentially. As will be explained in further detail below, this provides a benefit when accessing nearby pages in the GVPN address space during the resume operation, since it is much faster to read a block of sequential data from a disk than it is to read a group of smaller blocks of data stored in different locations on the disk.

Turning now to FIG. 5B, the host machine 502 represents a different host computer on which the guest VM 506 is to be resumed, or the same the host machine 502, but at a later time. Event 532 occurs when the host machine 502 begins executing guest 506. Assume for this example that guest 506 needs GVPN 1 of GVPNs 510 to begin executing. However, GVPN 1 of the GVPNs 510 maps to the GPPN 3 of the GPPNs 512, where the GPPN 3 of the GPPN 512 maps to page 3 of the host machine physical pages 505. Thus, a page fault occurs, and a VM kernel executing on the host machine 502 is responsible for locating the page 3 within storage 503. The VMkernel executing on the host machine 502 receives this request, and in response, communicates with the storage 403 to retrieve the page 3. The VMkernel also determines that GVPN 1 of the GVPNs 510 references page 3 (using methods described above with reference to either FIG. 2A or FIG. 2B). Once determined, the VMkernel determines which GVPNs are near GVPN 1 and translates each one to the corresponding GPPN. In one embodiment, the VMkernel is configured to determine two GVPNs that are nearby the GVPN 1—in this case, GVPN 2 and the GVPN 3, which are translated to the GPPN 8 and the GPPN 9, respectively. The VMkernel then retrieves pages 3, 8 and 9 from the storage 503 and returns them to the guest 506, as described below in event 534.

The event 534 occurs when the VMkernel has completed the processing required by the event 532. As previously described, each of the pages 3, 8 and 9—along with pages 7, 5 and 11, were relocated to the storage 503 upon the suspension of the guest 506. The VM kernel executing on the host machine 502 receives each of these pages from the storage 503 and stores them within the host machine physical pages 505. The VM kernel executing on the host machine 502 then notifies the guest OS that the GVPN 1 is now available. In this embodiment, the pages are stored to disk 503 in order of their corresponding GVPNs, i.e., GVPNs for application 508 1-6 correspond to GPPNs 3, 8, 9, 7, 5, and 11, respectively. Since this is the order the pages are stored to disk 503, reading out sequential GVPNs 1-3 can be accomplished with a single read request to disk 503 of a block of data encompassing pages 3, 8, and 9, rather than two or three separate read operations. Since rotating media disks require time to reposition the drive head and the disk under the drive head when reading each block of data, significant time can be saved when resuming a guest VM by storing the data as described, i.e., in order of GVPNs.

As described above, applications exhibit spatial locality when accessing guest virtual pages and therefore application 508 will likely access guest virtual pages nearby the GVPN 1 of the GVPNs 510. For example, the application 508 next accesses the GVPN 2 of the GVPNs 510. The GVPN 2 of the GVPNs 510 references the GPPN 8 of the GPPNs 512, which maps to host machine physical page 8 of the host machine physical pages 505. As previously described, the event 534 returned this host machine physical page 8 and, therefore, a page hit occurs.

Advantageously, the embodiments of the invention provide methods and systems for preserving spatial locality when performing migrations of guests from a source machine to a destination machine, when performing swap-ins and swap-outs of guests, and when performing suspensions and resumptions of guests. Applications exhibit spatial locality in the GVPN space. Embodiments of the invention provide techniques for catching a page fault for a particular GPPN, translating the faulted GPPN address into the GVPN space, locating a nearby GVPN pages, and translating each nearby GVPN page back into the GPPN space. Each translated GPPN is subsequently returned along with the faulted GPPN.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), such as CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for exporting spatial locality in a virtual address space of a guest executing on a host machine, the method comprising:
catching a page fault in response to a request to retrieve a guest physical page;
identifying a guest virtual page address that references the guest physical page, wherein said identifying the guest virtual page is performed by one of: (i) hardware included in the host machine, at the time of the page fault; and (ii) parsing an instruction of a software application executing within the guest virtual page that triggered the page fault;
identifying an address for each of one or more guest virtual pages that are nearby the guest virtual page;
translating each identified virtual page address into a corresponding guest physical page address;
transferring the guest physical page from a storage device into the memory; and
upon determining any of said corresponding guest physical pages are not in the memory, transferring said corresponding guest physical pages from the storage device into the memory.

2. The method of claim 1, wherein the guest physical page and said corresponding guest physical pages are exported to a destination machine as page faults occur in a virtual address space of the destination machine following a migration of the guest from the source machine to the destination machine.

3. The method of claim 1,
wherein the guest physical page is swapped-out to the storage device as part of a host-level swap; and
wherein the guest physical page and said corresponding guest physical pages are transferred from the storage device to the host machine when performing a swap-in of the guest physical page.

4. The method of claim 1, further comprising:
suspending the guest executing on the host machine, the suspending including writing, in guest virtual address space order, one or more guest physical pages of the guest to the storage device;
resuming the suspended guest on one of the host machine or another host machine; and
exporting said one or more guest physical pages from the storage device to the one of the host machine or the other host machine upon the resumption of the suspended guest.

5. A non-transitory computer-readable storage medium including instructions that, when executed by a processing unit of a computer system, cause the processing unit to export spatial locality in a virtual address space of a guest executing on a host machine, by performing the steps of:
catching a page fault in response to a request to retrieve a guest physical page;
identifying a guest virtual page address that references the guest physical page, wherein said identifying the guest virtual page is performed by one of: (i) hardware included in the host machine, at the time of the page fault; and (ii) parsing an instruction of a software application executing within the guest virtual page that triggered the page fault;
identifying an address for each of one or more guest virtual pages that are nearby the guest virtual page;
translating each identified virtual page address into a corresponding guest physical page address;
transferring the guest physical page from a storage device into the memory; and
upon determining any of said corresponding guest physical pages are not in the memory, transferring said corresponding guest physical pages from the storage device into the memory.

6. The non-transitory computer-readable storage medium of claim 5, wherein the guest physical page and said corresponding guest physical pages are exported to a destination machine as page faults occur in a virtual address space of the destination machine following a migration of the guest from the source machine to the destination machine.

7. The non-transitory computer-readable storage medium of claim 5,
wherein the guest physical page is swapped-out to the storage device as part of a host-level swap; and
wherein the guest physical page and said corresponding guest physical pages are transferred from the storage device to the host machine when performing a swap-in of the guest physical page.

8. The non-transitory computer-readable storage medium of claim 5, wherein the processing unit further performs the steps of:
suspending the guest executing on the host machine, the suspending including writing, in guest virtual address space order, one or more guest physical pages of the guest to the storage device;
resuming the suspended guest on one of the host machine or another host machine; and
exporting said one or more guest physical pages from the storage device to the one of the host machine or the other host machine upon the resumption of the suspended guest.

9. A computer system configured to export spatial locality in a virtual address space of a guest, the computer system comprising:
a memory;
a storage device for storing guest physical pages; and
a processing unit programmed to perform the steps of:
catching a page fault in response to a request to retrieve a guest physical page;
identifying a guest virtual page address that references the guest physical page, wherein said identifying the guest virtual page is performed by one of: (i) hardware included in the host machine, at the time of the page fault; and (ii) parsing an instruction of a software application executing within the guest virtual page that triggered the page fault;
identifying an address for each of one or more guest virtual pages that are nearby the guest virtual page;
translating each identified virtual page address into a corresponding guest physical page address;
transferring the guest physical page from a storage device into the memory; and
upon determining any of said corresponding guest physical pages are not in the memory, transferring said corresponding guest physical pages from the storage device into the memory.

10. The computer system of claim 9, wherein the guest physical page and said corresponding guest physical pages are exported to a destination machine as page faults occur in a virtual address space of the destination machine following a migration of the guest from the computer system to the destination machine.

11. The computer system of claim 9,
wherein the guest physical page is swapped-out to the storage device as part of a host-level swap; and wherein a virtual address spatial locality of the guest physical page is exported from the storage device to the computer system when performing a swap-in of the guest physical page.

12. The computer system of claim 9, wherein the processing unit is further configured to perform the steps of:
suspending the guest executing on the computer system, the suspending including writing, in guest virtual address space order, one or more guest physical pages of the guest to the storage device; and
exporting the virtual address spatial locality of the guest from the storage device to the computer system upon a resumption of the suspended guest.

* * * * *